United States Patent [19]

Stratton et al.

[11] 4,117,521
[45] Sep. 26, 1978

[54] FLEXIBLE DISC RECORDER WITH SKEWED TRANSDUCER TRANSPORT

[75] Inventors: Boyd Lehman Stratton, Woodside; William E. Nichols, San Jose, both of Calif.

[73] Assignee: Arvin Industries, Inc., Columbus, Ind.

[21] Appl. No.: 738,673

[22] Filed: Nov. 4, 1976

[51] Int. Cl.² ............................................. G11B 21/24
[52] U.S. Cl. ...................................... 360/99; 360/109
[58] Field of Search .................... 360/107, 106, 97–99, 360/109, 101, 103, 86

[56] References Cited

U.S. PATENT DOCUMENTS

| 3,761,644 | 9/1973 | Camras | 360/109 |
| 3,900,888 | 8/1975 | Uchikoshi et al. | 360/76 |
| 4,020,505 | 4/1977 | Iwadka et al. | 360/107 |

*Primary Examiner*—John H. Wolff
*Attorney, Agent, or Firm*—Biebel, French & Nauman

[57] ABSTRACT

A disc recorder has a rotating flexible recording disc and a transducer which is radially movable with respect to the disc. The transducer defines a gap which extends radially of the disc and is positioned for most efficient operation with the disc in closely coupled relation to the transducer on both sides of the gap. A transducer transport includes a guide member extending transversely of the axis of rotation of the flexible disc and defining a guide surface. The transducer is mounted on a carriage which moves along the guide member in contact with the guide surface such that the transducer is moved radially with respect to the rotating disc. A slot in the guide member permits the guide surface to be distorted such that the transducer carriage is tilted as it is moved along the guide surface, thereby maintaining the desired closely coupled relation between the transducer and the disc.

5 Claims, 9 Drawing Figures

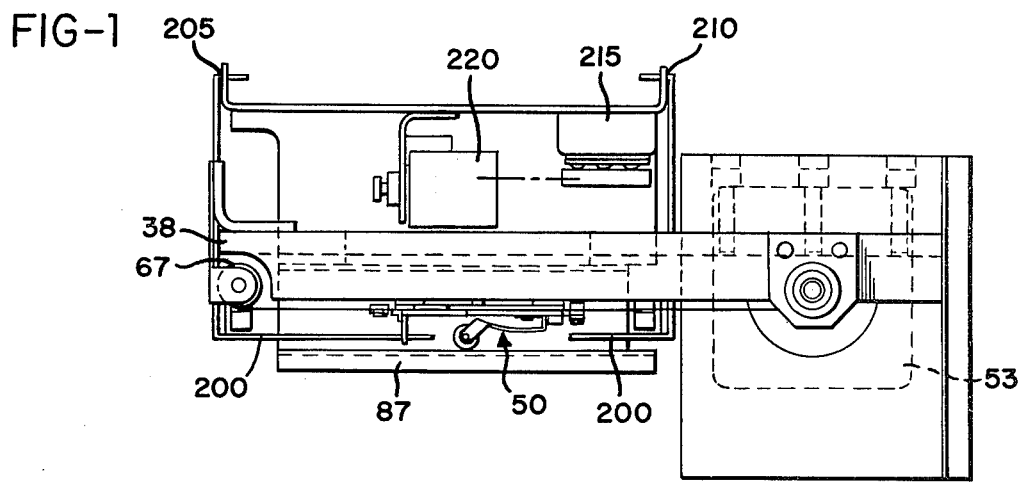
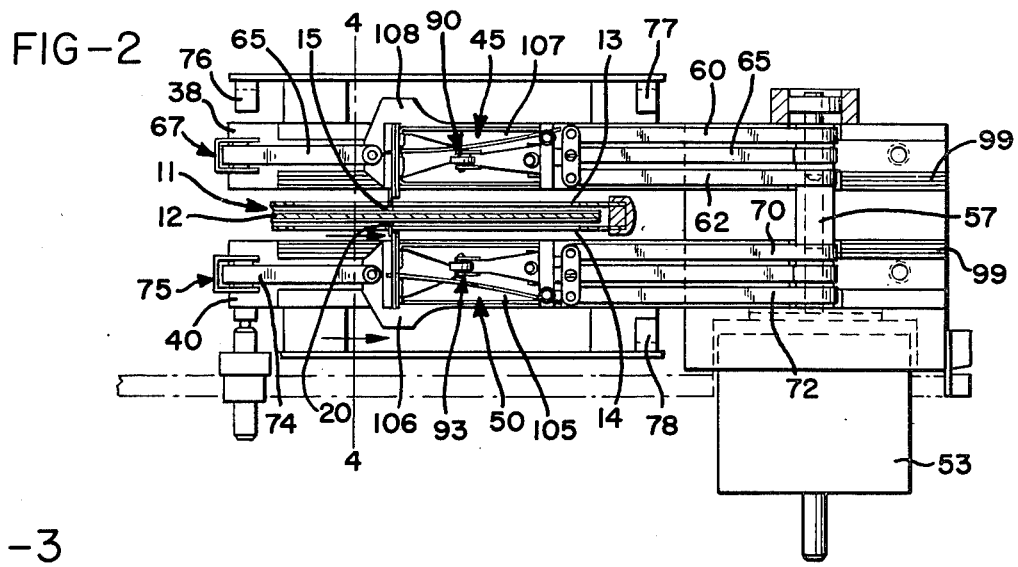
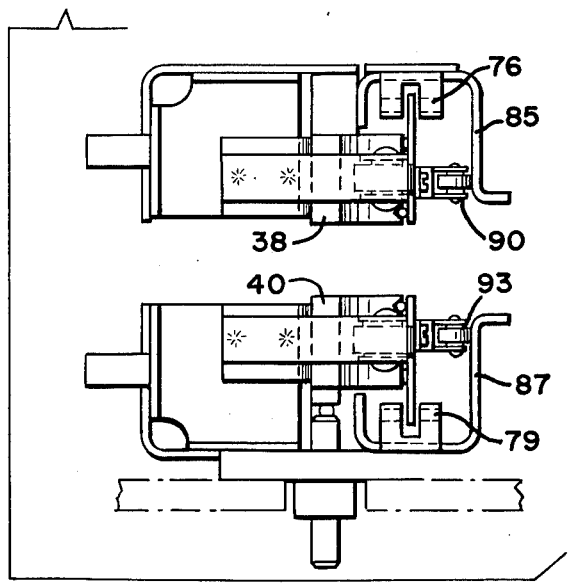
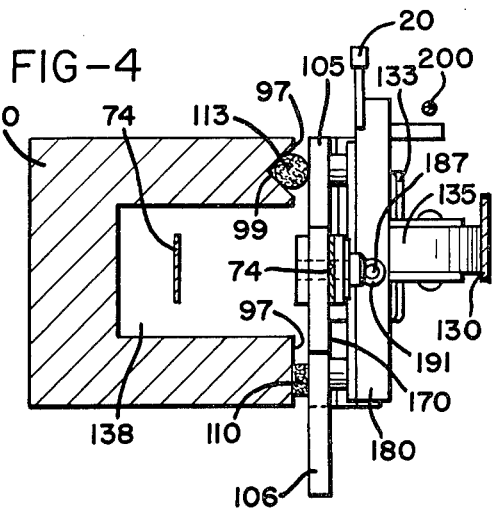

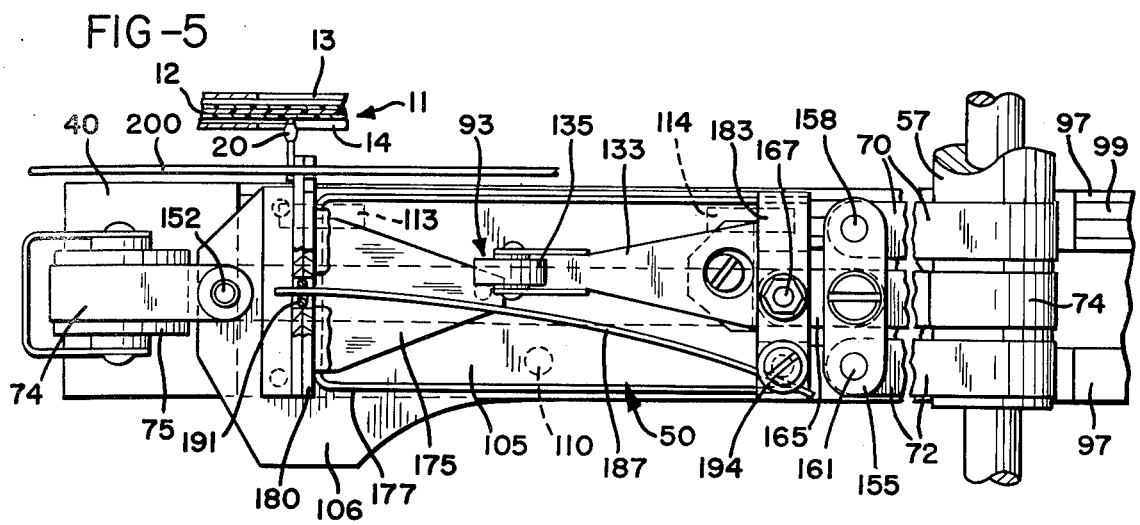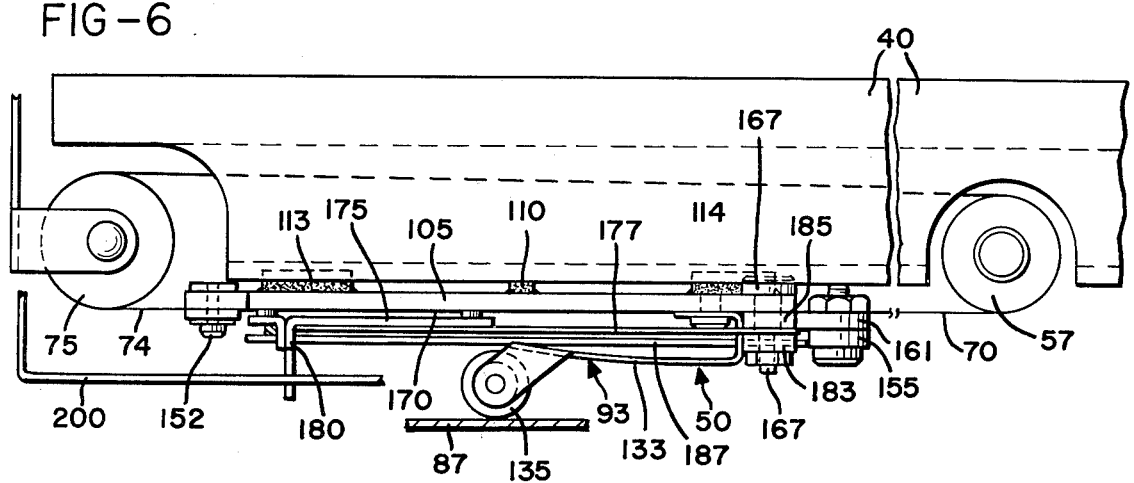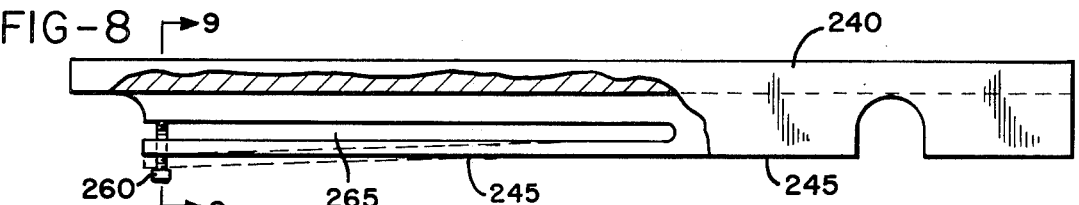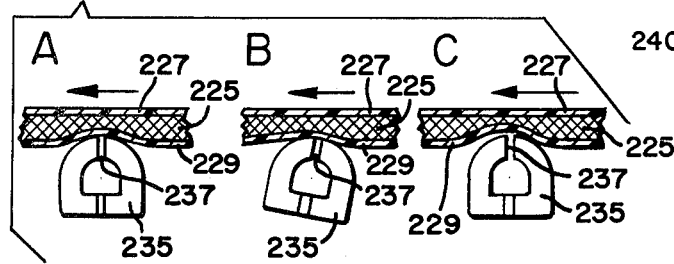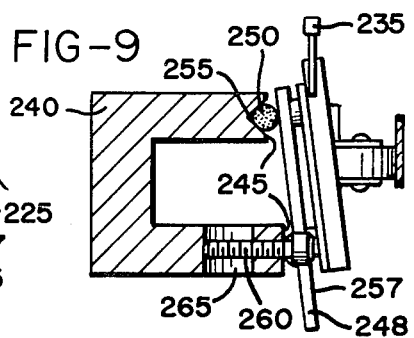

FLEXIBLE DISC RECORDER WITH SKEWED TRANSDUCER TRANSPORT

BACKGROUND OF THE INVENTION

The present invention relates to disc recorders and, more specifically, to recorders in which video information is recorded on a flexible magnetic disc. The magnetic disc used typically may be a laminate construction in which a cloth material is sandwiched between two layers of thin flexible material. The layers of flexible material are coated with magnetic particles and define the recording surfaces of the disc. The recording disc is rapidly rotated and one or more transducer heads are positioned in contact with the disc to record and reproduce the video information. If desired, transducers may be provided for recording and playback on both sides of the magnetic disc.

Recording of video signals on a disc recorder may be accomplished with one of several formats. In one format, the video signal is stored in a number of circular concentric recording tracks and the transducer is moved only intermittently to the desired track for recording or playback. In a second format, the transducer head is moved continuously in a radial path as the disc is rotated, thus defining a continuous, spiral recording track.

The flexible magnetic disc used in such a recorder is rotated at a speed which is sufficiently high to generate centrifugal forces making it unnecessary to support the disc at a point other than its center. It can be appreciated, however, that tension of the disc, resulting from the outwardly directed centrifugal forces created during rotation, will be much less at a point near the periphery of the disc than at a point near its center. This is so because the mass of the material outward from a point near the periphery of the disc is much less. Since the transducer heads used in a flexible disc recorder actually make contact with the disc surface and exert a slight pressure on that surface, the recording surface of the disc will tend to be distorted more out of its plane of rotation by a transducer head when the transducer head is in contact with a point near its periphery than when the head is positioned radially inward. This non-uniformity in the distorting effect of the transducer head on the flexible recording surface results in non-uniform transducer effectiveness unless some provision for compensation is made.

A typical transducer head consists of two cores on which one or more groups of windings have been wound. Each core is separated from the other by non-magnetic material, thus defining a gap. When the windings on the cores are energized, the fringing flux at the gap will magnetize particles in the coating on the recording surface of the disc. During playback, the magnetized particles passing adjacent the gap will generate flux flow through the cores and induce current flow in the windings. For effective recording and playback it is necessary that the recording disc be maintained in a closely coupled relationship with the transducer head on both sides of the gap. Distortion of the recording surface of the flexible disc as the transducer head moves radially toward the periphery of the disc may prevent the transducer head from maintaining the desired positional relationship with respect to the disc. This may occur even when transducer heads are positioned exactly opposite each other on both sides of the disc, since the center cloth lamination tends to isolate the recording surfaces from each other.

SUMMARY OF THE INVENTION

A disc recorder has a rotating flexible recording disc and a transducer, radially movable with respect to the disc. The transducer defines a gap extending radially of the disc and operates most efficiently when maintained in closely coupled relation with the disc on both sides of the gap. The guide member extends transversely of the rotating disc and defines a guide surface. A transducer carriage means for mounting the transducer is moved along the guide member in contact with the guide surface by a means for moving the carriage means such that the transducer is moved radially with respect to the rotating recording disc. A means for altering the guide surface is provided such that the transducer carriage means is tilted as the carriage is moved along the guide surface. The transducer is oriented obliquely to the plane of rotation of the disc when near the periphery of the disc and is oriented perpendicularly to the disc as the transducer is moved toward the center of the disc. The guide surface is altered by spreading a slot in the guide member with a threaded adjustment screw extending across the slot.

Accordingly, it is an object of the present invention to provide a flexible disc recorder in which proper transducer orientation with respect to the disc is maintained; to provide such a recorder in which the transducer is tilted obliquely with respect to the plane of rotation of the disc as it approaches the periphery of the disc; and, further, to provide a recorder in which transducer orientation may be quickly and accurately adjusted.

Other objects and advantages of the present invention will be apparent from the following description, the accompanying drawings, and the appended claims.

BRIEF DESCRIPTION OF THE DRAWINGS

FIG. 1 is a plan view of a recorder embodying the present invention with portions of the device removed;

FIG. 2 is a front view of the recorder of FIG. 1;

FIG. 3 is a side view of a portion of the recorder as seen looking left to right in FIG. 2;

FIG. 4 is an enlarged sectional view taken generally along line 4—4 in FIG. 2;

FIG. 5 is an enlarged front view showing the details of the transducer transport mechanism;

FIG. 6 is a plan view of the portion of the device shown in FIG. 5;

FIGS. 7A, 7B, and 7 are enlarged partial sectional views showing the interaction between a transducer head and a recording disc; and FIG. 8 is a plan view of the guide member used with a recorder embodying the present invention; and FIG. 9 is an enlarged sectional view taken generally along line 9—9 in FIG. 8, with the transducer and carriage added.

DETAILED DESCRIPTION OF THE INVENTION

Referring now to FIGS. 1, 2 and 3, there is shown a portion of a disc recorder embodying the present invention. FIG. 1 is a plan view with portions of the device removed and broken away. FIG. 2 is a front view of the recorder with the disc cartridge in section. FIG. 3 is a view looking left to right in FIG. 2 with the transducer assemblies and the disc cartridge removed. While disc recorders for recording video signals may use either rigid magnetic discs or flexible discs, those recorders using flexible discs offer greater versatility while reducing the possibility of damage to the disc during operation of the recorder. As seen in FIG. 2, a cartridge 11 may be provided in which the flexible magnetic recording disc 12 is housed. Radially extending slots 13 and 14 in each side of the disc cartridge 11 permit access to the disc by transducers 15 and 20.

The record disc 12 extends between a pair of guide members 38 and 40, one above and one below the disc as shown in FIG. 2. The transducer assemblies 45 and 50 are moved along guide members 38 and 40, respectively, by stepping motor 53. A common drive pulley 57 is used to move both transducer assemblies with the result that they are stepped simultaneously to corresponding positions on opposite sides of the disc. Carriage belt means, including a first carriage belt 60, second carriage belt 62, and third carriage belt 65 move transducer assembly 45 when drive pulley 57 is rotated. Idler pulley 67 at the opposite end of the guide member 38 positions belt 65 as assembly 45 is moved. In like manner, belts 70, 72 and 74 and idler pulley 75 move transducer assembly 50 along guide member 40.

The extent of travel of transducer assemblies 45 and 50 is limited by photo sensors 76, 77, 78 and 79. Sensor 78 is used as a reset to detect when the transducers have been moved to an initial position. The sensors 76, 77 and 79 are provided to protect against overtravel and are not actuated during normal recorder operation.

Running parallel to guide members 38 and 40 are locating members 85 and 87 (FIGS. 1 and 3). Loading means 90 and 93, mounted on transducer assemblies 45 and 50, interact with locating members 85 and 87 to assure the positional stability of the transducer assemblies, as is more fully explained below. The transports for the upper and lower transducers 19 and 20 are identical.

Each of the guide members 38 and 40 is generally U-shaped in cross section, as seen in FIG. 4 and provides a guide surface 97 extending transversely of the disc 35 and including a groove 99 extending parallel to the disc. FIG. 4, an enlarged sectional view of guide member 40, shows transducer carriage means 105 having tab 106 which interacts with the photosensors as explained above. Carriage means 107 likewise includes tab 108 for actuating the appropriate photosensors.

Friction reducing bearing pad 110 is attached to carriage means 105 and slides along guide surface 97. A pair of cylindrical bearing means 113 and 114 are mounted on the carriage member 105 in spaced relation to bearing pad 110 and are positioned to be slidable in groove 99. Loading means 93 includes leaf spring 133 and roller 135 which engage locating surface 130 and bias carriage means 105 toward guide surface 97. Groove 99 and bearing means 113 and 114 prevent relative vertical motion between carriage means 105 and guide member 40 as the transducer assembly is moved along the guide member.

Referring now to FIGS. 5 and 6, the details of the transducer transport mechanism are shown. Guide member 40 extends between drive pulley 57 and idler pulley 75. Carriage means 105 includes friction reducing cylindrical bearing means 113 and 114 and a bearing pad 110. The bearing means and bearing pad allow the carriage means 105 to slide along guide member 40 on guide surface 97. As shown in FIG. 4, groove 99 engages the cylindrical bearing pads on the carriage means as a result of the interaction between loading means 93 and locating surface 130.

The carriage means 105 is moved along guide member 40 such that the transducer head 20 moves radially with respect to flexible recording disc 12. First and second carriage belts 70 and 72 are each attached at one end to carriage means 105 and at the other end to drive pulley 57. Belts 70 and 72 will typically be pinned to drive pulley 57 and will be wrapped around the pulley a number of times. Also pinned to pulley 57 and wrapped around it is third carriage belt 74. Belt 74 is attached to carriage means 105 and extends in the opposite direction from the first and second belts 70 and 72. It should be noted that the third belt 74 is attached to drive pulley 57 intermediate second belts 70 and 72. As seen in FIG. 4, belt 74 extends from idler pulley 75 to drive pulley 57 through cavity 138.

Belt 74 is pivotally attached by bolt 152 to carriage means 105. On the opposite side of the carriage means, a "T"-shaped linkage arrangement is connected to belts 70 and 72. A first linkage means 155 is pivotally attached to belts 70 and 72 at pivot points 158 and 161. A second linkage means 165, attached to the first linkage means 155 intermediate the first and second carriage belts 70 and 72, is pivotally secured to carriage means 105 by bolt 167. The opposing forces applied to the carriage means 105 by the first, second, and third belts are therefore aligned. Second linkage means 165 is secured to carriage means 105 by bolt 167. Since the axes of the drive and idler pulleys are parallel, the friction between the belts and the pulleys is reduced and transducer movement may therefore be effectuated very rapidly. Additionally, since the carriage belts are not twisted, there is not twisting moment applied to the carriage means.

Transducer carriage 105 includes a mounting surface 170 which is substantially perpendicular to rotating disc 12 and substantially parallel to the direction of movement of carriage 105. A transducer holding plate 175 is positioned adjacent and parallel to mounting surface 170. Parallel motion linkage means 177 includes a generally U-shaped wire which attaches the transducer holding plate 175 to carriage 105. The parallel motion linkage means confines the motion of the transducer holding plate 175 in a plane parallel to the mounting surface 170 to motion which is substantially perpendicular to rotating disc 12. Parallel linkage means 177 is attached to holding plate 175 by potting the wire along the side of flange 180. The ends of the wire are rigidly secured between bar 183 and backing blocks 185. It should be understood that two separate parallel wires could be used as the parallel linkage means with the first ends of the wires attached to the mounting surface 170 and the other ends attached to holding plate 175.

Spring means, including wire spring arm 187, biases the transducer holding plate 175 against mounting surface 170 and also biases plate 175 toward rotating disc 12. Transducer means 20 is rigidly attached to holding plate 175 and thus moves toward disc 12 with a biasing force determined by spring 187. Spring 187 extends through a bearing in the form of a glass bead 191 set in flange 180. The other end of spring 187 is adjustably secured by mounting 194 to bar 183. Glass bead 191 prevents twisting forces from being applied to holding plate 175 by spring 187.

The transducer assembly of the present invention is particularly useful where rapid transducer movement is required due to its low inertial mass. Additionally, the force exerted on the recording disc by the transducer head may be easily and precisely adjusted.

Bale 200 is provided adjacent the upper edge of flange 180 and extends along the length of travel of transducer 20. A similar bale is provided for transducer assembly 45. As seen in FIG. 1 these bales extend to pivots 205 and 210 and are linked to rotary solenoid 215 and dashpot 220. When solenoid 215 is actuated, the bales contact the transducer holding plates and move heads 15 and 20 away from flexible disc 12. The motion of the recording heads is sufficient to allow disc 12 and cartridge 11 to be withdrawn from the recorder.

Referring now to FIGS. 7-9, there is shown a transducer transport arrangement embodying the present invention and applicable to the recorder of FIGS. 1-6. FIG. 7 illustrates the interaction between a transducer head and a recording disc as seen looking outward from the center of the disc. The direction of disc rotation is indicated. As seen in FIG. 7A, a typical recording disc is laminated in construction, with a layer of cloth material 225 sandwiched between flexible layers 227 and 229, which provide the upper and lower recording surfaces of the disc. Transducer head 235 defines a gap 237 which extends radially of the disc and is generally perpendicular to the disc.

FIG. 7A depicts transducer interaction with the disc when the transducer is near the center of rotation of the disc. The large centrifugal forces acting on the central portion of the disc pull the disc material taut and transducer 235 will therefore distort material 229 only slightly. As seen in FIG. 7A, the recording surface of the disc impinges on the core 235 on both sides of the gap 237. Such an arrangement is optimal for recording since the fringing flux at gap 237 which is induced in core 235 by current flow through transducer windings (not shown) is greatest near the gap. Likewise, this arrangement is optimal for playback.

If the transducer head 235 were to be held perpendicular to the plane of rotation of the disc as the transducer is moved toward the periphery of the disc, the condition diagrammatically illustrated in FIG. 7C would result. Since the centrifugal tensioning of the disc material near its periphery is much less than near its center, the periphery of the disc is more affected by the biasing force applied to the transducer head. Flexible material 225 is therefore distorted out of the plane of rotation of the disc more severely with the result that the recording surface moves away from the gap 237. The effect of fringing flux in the recording surface is therefore impaired and recording (or playback) effectiveness is reduced.

The approach taken to solving the problem by the present invention is shown in FIG. 7B. Transducer 235 continues to be held as shown in FIG. 7A when positioned near the center of rotation of the disc. However, as the transducer is moved radially with respect to the disc toward the disc periphery, the transducer is skewed as shown in FIG. 7B with the result that the proper magnetic coupling between the core 235 near gap 237 and the recording surface is maintained.

An arrangement for tilting the transducer head is shown in FIGS. 8 and 9. FIG. 8 is a plan elevational view, with portions broken away and in section, of a guide member 240. As with the recorder shown in FIGS. 1-6, the guide member defines positioning means comprising guide surfaces 245 which determine the orientation of a transducer carriage 248. As shown in FIG. 9, cylindrical bearing means 250 interacts with a groove 255 to position carriage 248 vertically. The transducer mounting arrangement is identical with that depicted in FIGS. 1-6, with one exception-transducer head 235 is mounted obliquely to the mounting surface 257 of carriage means 248. A threaded adjustment screw 260 is added to spread slot 265 in guide member 240, thus providing an adjustment means for altering guide surface 245 such that transducer carriage means 248 is tilted. The attitude of carriage means 248 is therefore varied as the transducer is moved radially along the disc.

As shown in FIG. 9, the spreading of slot 265 by screw 260 results in the transducer head 235 being held substantially vertical when it is near the center of rotation of the disc. As the transducer is moved radially outward with respect to the disc, the carriage means 248 is tilted less and less until, near the periphery of the disc, surface 257 of carriage means 248 is substantially vertical. Since transducer head 235 is mounted obliquely with respect to surface 257, the transducer will be tilted slightly "upstream" to the direction of disc rotation, as shown in FIG. 7B. Effective magnetic coupling will therefore be maintained between the recording surface and the transducer.

It should be understood, of course, that there are numerous ways of effecting transducer reorientation along the extent of its radial travel. A slot could be formed in another portion of guide member 40 and either widened or narrowed in order to selectively vary the plane of the guide surface.

While the forms of apparatus herein described constitute preferred embodiments of the invention, it is to be understood that the invention is not limited to these precise forms of apparatus, and that changes may be made therein without departing from the scope of the invention.

What is claimed is:

1. In a disc recorder having a rotatable flexible recording disc and a transducer radially movable with respect to the disc, the transducer defining a gap extending radially of the disc and positioned for most efficient recording operation with the disc in closely coupled relation to the transducer on both sides of the gap, a transducer transport comprising:
   a guide member extending transversely of the axis of rotation of the flexible disc and defining guide surfaces,
   transducer carriage means for mounting the transducer,
   means for moving said carriage means along said guide member in contact with said guide surfaces such that the transducer is moved radially with respect to the rotating recording disc, and
   means for positioning said guide surfaces such that said transducer carriage means is progressively tilted as said carriage means is moved along said guide surfaces toward the periphery of said disk such that the desired closely coupled relation between the transducer and the disc is maintained.

2. A disc recorder having a flexible disc and a transducer defining a gap, the transducer being properly positioned when sufficiently magnetically coupled with the disc on both sides of the gap, comprising:
   a transducer,
   a transducer assembly for holding the transducer,
   a flexible disc rotatable in a plane,
   a guide member, including positioning means determining the attitude of said transducer head with respect to said flexible disc, positioned transversely to said disc, means for moving said transducer assembly along said guide member, and means for adjusting said positioning means along the length of said guide member such that the attitude of said transducer is progressively varied with respect to the plane of rotation of said disc as said head is moved radially outwardly with respect to said disc, whereby said transducer is properly positioned with respect to said disc.

3. A disc recorder comprising:

a flexible magnetic recording disc, means for rotating said disc, a transducer magnetically coupled to said disc including a gap extending radially of the disc, a guide member having guide surfaces extending transversely of the said rotating disc, transducer mounting means holding said transducer and movable along said guide surfaces such that said transducer is moved radially with respect to said rotating disc, drive means for moving said transducer mounting means with respect to said guide surfaces, and means for adjustably varying the orientation of said guide surfaces along the length of said surfaces such that said transducer is progressively tilted with respect to said rotating disc as it is moved towards the periphery of said disc by said drive means to maintain said gap in essentially a constant coupled relation to the surface of said disc.

4. A disc recorder comprising:

a rotatable disc, a transducer magnetically coupled to said disc, a guide member having guide surfaces extending transversely of said rotating disc and including a groove extending parallel to said disc, carriage means movable along said guide surfaces for mounting the transducer, said transducer being mounted obliquely to said guide surfaces, a friction reducing bearing pad mounted on said carriage member and movable along one of said guide surfaces, friction reducing cylindrical bearing means mounted on said carriage member is spaced relation to said pad and movable in said groove, a locating member having a locating surface, loading means mounted on said carriage member and engaging said locating surface to bias said carriage member toward said guide surfaces such that said bearing pad engages said one of said guide surfaces and said cylindrical bearing means engages said groove, means for moving said carriage member along said guide surfaces, and adjustment means for positioning said guide surfaces such that said transducer is oblique to the plane of rotation of said disc when positioned near the periphery of said disc and is moved to an orientation essentially perpendicular to said disc as said transducer is moved toward the center of said disc.

5. The disc recorder of claim 4 in which said adjustment means comprises a slot in said guide member and a threaded adjustment screw extending across said slot for changing the width of said slot and thereby affecting the orientation of said guide surface.

* * * * *

UNITED STATES PATENT AND TRADEMARK OFFICE
CERTIFICATE OF CORRECTION

PATENT NO. : 4,117,521
DATED : September 26, 1978
INVENTOR(S) : Boyd Lehman Stratton and William E. Nichols It is certified that error appears in the above–identified patent and that said Letters Patent are hereby corrected as shown below:

Column 8, line 12: "is" should be --in--

Column 8, line 14: "loading ....." should start a new paragraph.

Signed and Sealed this

Ninth Day of January 1979

[SEAL]

Attest:

RUTH C. MASON
Attesting Officer

DONALD W. BANNER
Commissioner of Patents and Trademarks